United States Patent
Khan

(10) Patent No.: US 12,028,246 B2
(45) Date of Patent: *Jul. 2, 2024

(54) COLLECTION OF SEGMENT ROUTING IPV6 (SRV6) NETWORK TELEMETRY INFORMATION

(71) Applicant: Cisco Technology, Inc., San Jose, CA (US)

(72) Inventor: Amir Khan, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/134,285

(22) Filed: Apr. 13, 2023

(65) Prior Publication Data
US 2023/0246955 A1    Aug. 3, 2023

Related U.S. Application Data

(63) Continuation of application No. 17/540,975, filed on Dec. 2, 2021, now Pat. No. 11,671,354.

(30) Foreign Application Priority Data

Oct. 18, 2021 (IN) .............................. 202141047177

(51) Int. Cl.
*H04L 12/00* (2006.01)
*H04L 45/00* (2022.01)
(Continued)

(52) U.S. Cl.
CPC .............. *H04L 45/34* (2013.01); *H04L 45/04* (2013.01); *H04L 45/74* (2013.01)

(58) Field of Classification Search
CPC ....... H04L 43/106; H04L 45/34; H04L 45/04; H04L 45/74
(Continued)

(56) References Cited

U.S. PATENT DOCUMENTS 7,539,770 B2 * 5/2009 Meier ................. H04L 61/5014
709/236
7,957,405 B2 * 6/2011 Higuchi ............. H04L 61/2525
370/466
(Continued)

FOREIGN PATENT DOCUMENTS

| CN | 109379359 | 2/2019 |
| CN | 112910774 | 6/2021 |

OTHER PUBLICATIONS

Office Action for U.S. Appl. No. 17/540,975, dated Sep. 21, 2022, Khan, "Collection of Segment Routing IPV6 (SRV6) Network Telemetry Information", 19 Pages.
(Continued)

*Primary Examiner* — Frantz Coby
(74) *Attorney, Agent, or Firm* — Lee & Hayes P.C.

(57) ABSTRACT

Techniques and mechanisms for monitoring and processing telemetry information of an Internet Protocol version 6 (IPv6) packet in a network. The IPv6 packet includes an IPv6 header having a Segment Identifier (SID) field, and a function field. According to this disclosure, the function field may include a function associated with an operation for collecting telemetry information of a first node indicated by the SID field. When the function executed by the first node, it may collect the telemetry information from the first node, and export the telemetry information to a collector node. Further, the function may indicate an operation for collecting the telemetry information of a set of paths including one or more nodes, where the telemetry path can be changed dynamically. In this way, each node in the telemetry path may define a new path for collecting the telemetry information.

20 Claims, 12 Drawing Sheets

(51) Int. Cl.
   *H04L 45/02* (2022.01)
   *H04L 45/74* (2022.01)
(58) Field of Classification Search
   USPC .................................................. 709/237–239
   See application file for complete search history.

(56) References Cited

U.S. PATENT DOCUMENTS

| | | | | |
|---|---|---|---|---|
| 8,065,515 | B2* | 11/2011 | Droms | H04L 61/5061 |
| | | | | 713/153 |
| 8,854,965 | B1 | 10/2014 | Richards | |
| 8,887,234 | B2* | 11/2014 | Wen | H04L 69/16 |
| | | | | 713/168 |
| 9,461,875 | B2* | 10/2016 | Groat | H04L 61/5092 |
| 11,671,354 | B2* | 6/2023 | Khan | H04L 45/04 |
| | | | | 709/238 |
| 2002/0176420 | A1 | 11/2002 | Tsuchiya et al. | |
| 2002/0181465 | A1 | 12/2002 | Tsuchiya et al. | |
| 2008/0095154 | A1* | 4/2008 | Jun | H04L 61/5092 |
| | | | | 370/389 |
| 2013/0235871 | A1 | 9/2013 | Brzozowski et al. | |
| 2014/0006638 | A1 | 1/2014 | Kavanagh et al. | |
| 2018/0288503 | A1 | 10/2018 | Chayat et al. | |
| 2019/0296988 | A1 | 9/2019 | Bhandari et al. | |
| 2020/0099611 | A1 | 3/2020 | Filsfils et al. | |
| 2020/0358698 | A1 | 11/2020 | Song et al. | |
| 2021/0135967 | A1 | 5/2021 | Iorga et al. | |
| 2022/0174011 | A1 | 6/2022 | Filsfils et al. | |
| 2022/0210075 | A1 | 6/2022 | Musleh et al. | |
| 2023/0118989 | A1 | 4/2023 | Khan | |

OTHER PUBLICATIONS

Ali, Z. et al., "Operations, Administration, and Maintenance (OAM) in Segment Routing Networks with IPV6 Data Plane (SRV6) Draft-IETF-6MAN-SPRING-SRV6-OAM-11", https://tools.letf.org/ Published Jun. 2, 2021, 23 pages.

PCT Search Report and Written Opinion dated Feb. 3, 2023 for PCT application No. PCT/US2022/046965, 13 pages.

* cited by examiner

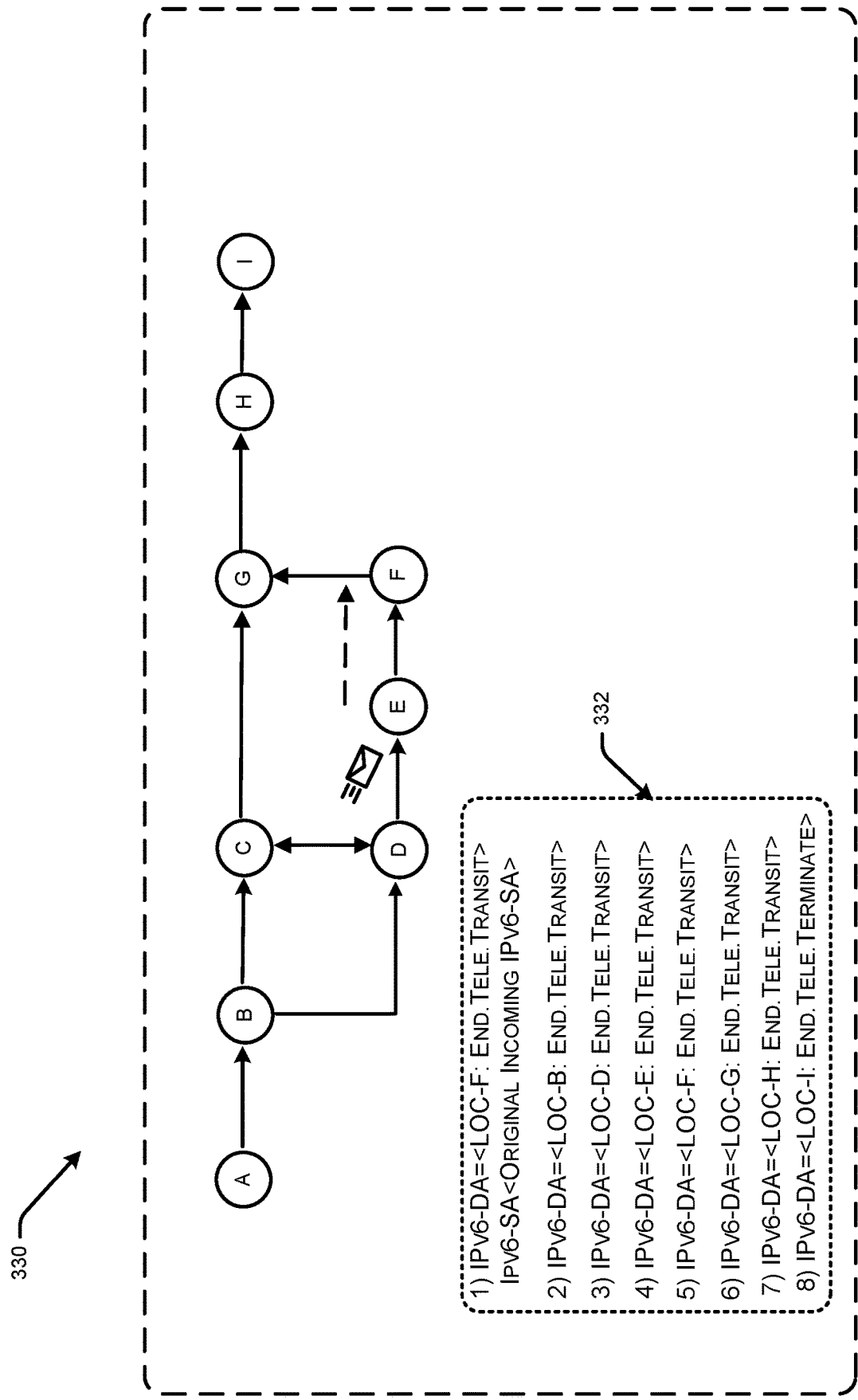

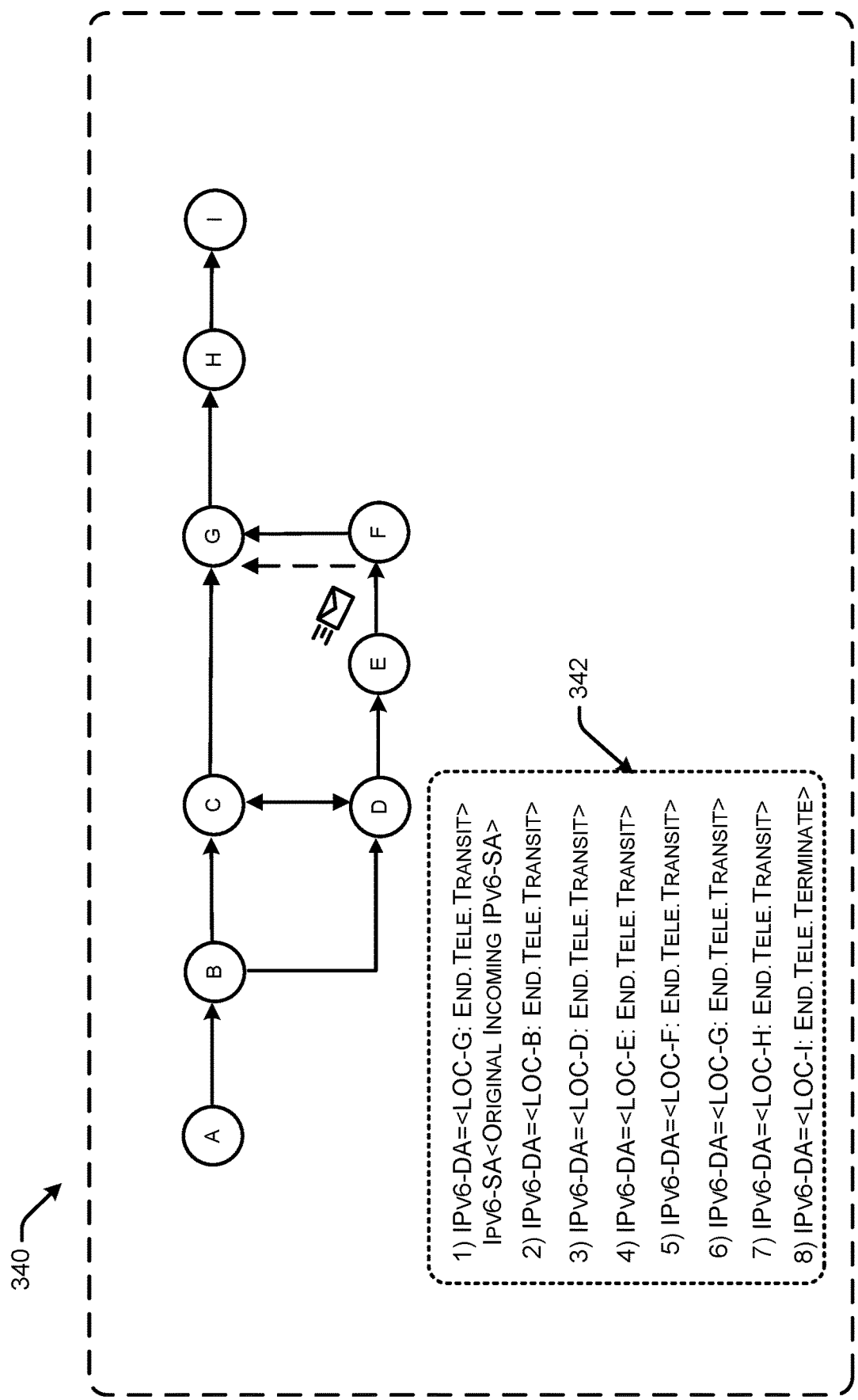

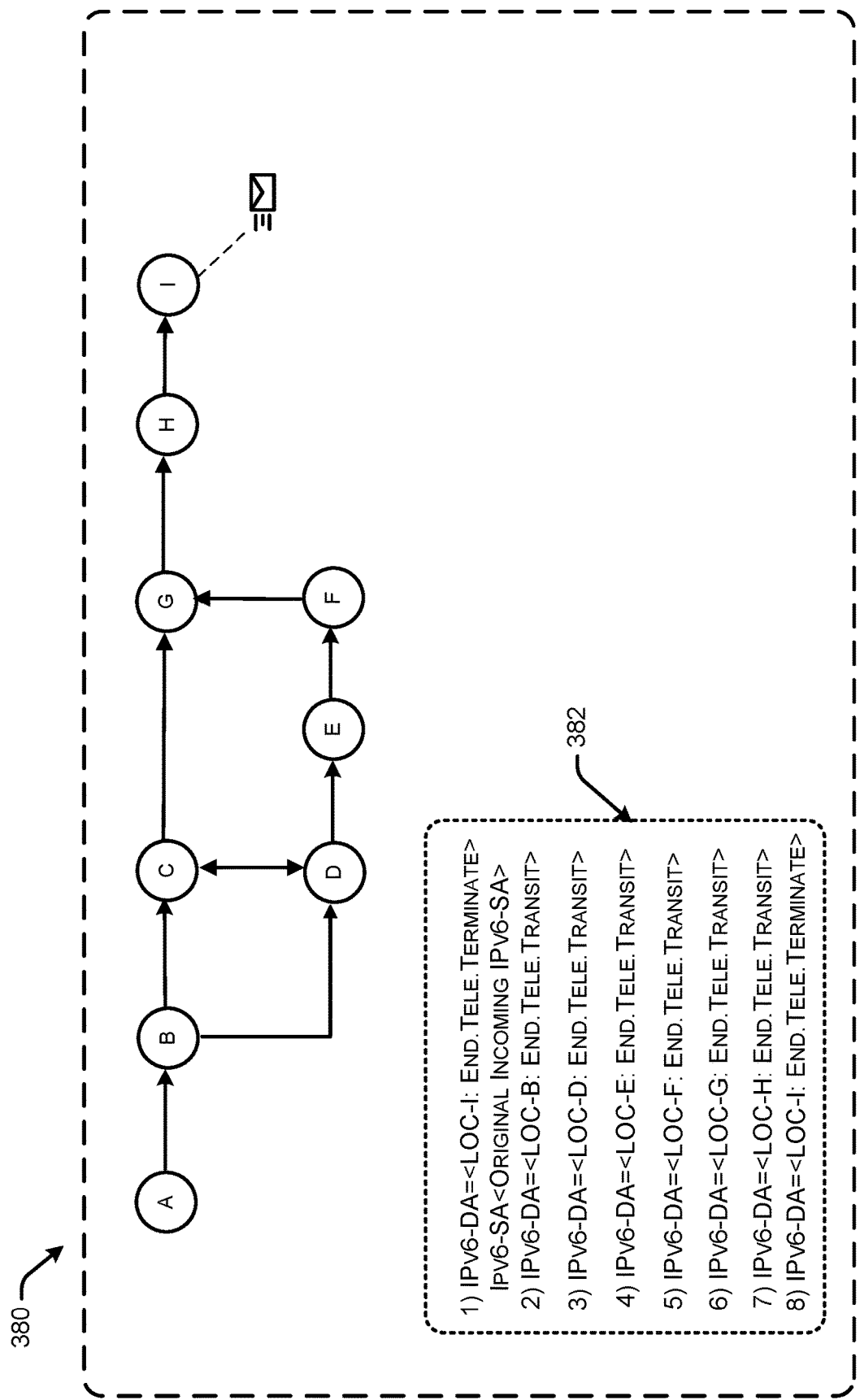

400 ↘

```
┌─────────────────────────────────────────────────────────────────────┐
│   RECEIVING, BY A FIRST NETWORK NODE IN A NETWORK, A FIRST INTERNET │
│   PROTOCOL VERSION 6 (IPV6) PACKET HAVING AN IPV6 HEADER INCLUDING A│
│   DESTINATION ADDRESS FIELD THAT IS POPULATED WITH A FIRST DESTINATION│
│   ADDRESS, THE FIRST DESTINATION ADDRESS INCLUDES, A FIRST SEGMENT  │
│   IDENTIFIER (SID) ASSIGNED TO THE FIRST NODE, AND AN INDICATION OF A FIRST│
│   FUNCTION TO BE PERFORMED BY THE FIRST NETWORK NODE, WHEREIN THE FIRST│
│   FUNCTION IS ASSOCIATED WITH AN OPERATION FOR HANDLING TELEMETRY   │
│                              INFORMATION                            │
│                                  402                                │
└─────────────────────────────────────────────────────────────────────┘
                                    │
                                    ▼
┌─────────────────────────────────────────────────────────────────────┐
│   EXECUTING, BY THE FIRST NETWORK NODE THE FIRST FUNCTION TO PERFORM│
│         THE OPERATION FOR HANDLING THE TELEMETRY INFORMATION        │
│                                  404                                │
└─────────────────────────────────────────────────────────────────────┘
                                    │
                                    ▼
┌─────────────────────────────────────────────────────────────────────┐
│   SENDING, FROM THE FIRST NETWORK NODE, THE FIRST IPV6 PACKET HAVING THE│
│      IPV6 HEADER INCLUDING A SECOND FUNCTION TO A SECOND NODE       │
│                                  406                                │
└─────────────────────────────────────────────────────────────────────┘
```

FIG. 4

COLLECTION OF SEGMENT ROUTING IPV6 (SRV6) NETWORK TELEMETRY INFORMATION

RELATED APPLICATIONS

This application claims priority to and is a continuation of U.S. patent application Ser. No. 17/540,975, filed on Dec. 2, 2021, which claims priority to India Provisional Patent Application No. 202141047177, filed on Oct. 18, 2021, the entire contents of which are incorporated herein by reference.

TECHNICAL FIELD

The present disclosure relates generally to processing and collecting network telemetry information.

BACKGROUND

In computer networking, network telemetry determines how information from various data sources are collected using a set of automated communication process, performed at a remote network node to transmit measurement to a receiving station for storage and analysis tasks. For example, network devices such as routers, firewall and switches may transmit data continuously to one or more centralized locations for storage and analysis. Performing accurate telemetry process, will help to accelerate network troubleshooting, increase network capacity, and improve network performance and user experience. The proper type of telemetry applied to a network enables network operators to address network blind spots proactively and maintain network operation efficiently.

Inband Network Telemetry (INT) and In-Situ Operation, Administration and Maintenance (IOAM) are the two standard technology to collect in-band network data for a packet traversing across networks. In-band network telemetry technology collects hop-by-hop network status information through packets to achieve end-to-end visualization of network services. In-band network telemetry uses the data plane to directly drive the network measurement process, subverting the research idea of traditional network measurement that treats network switching device as an intermediate black box. In-band network telemetry technology has the advantages of flexible programming, strong real-time, less noise and path-level network status perception, etc. In IOAM technology, the telemetry information is recorded while the packet traverse between two nodes in the network. The In-Situ operation in OAM describes that the telemetry data is added to the data packet rather than is being sent within packet specifically dedicated to telemetry.

INT and IOAM technologies utilize a similar technique for collecting in-band network telemetry data. The data collection boundary in INT technology is called INT-Domain, and the data collection boundary in IOAM is called IQAM-Namespace. Further, three different node types are defined based on the function performed on the data boundary in both technologies:

i) INT-Source or IOAM-Encapsulating node (Start node): This node is the starting point where the network telemetry information is collected for a flow. At this node, a new telemetry header is added to the packet, and the node local telemetry information is added to the telemetry header. Also, this node defines what type of network data to be collected based on either instruction bitmap in INT or Trace-Type in IOAM.

ii) INT-Transit or IOAM-Transit Nodes (Transit nodes): These are in-between nodes which simply collects telemetry information based on the instruction encoded in the INT or IOAM header. These nodes add local telemetry information to the existing telemetry header based on instruction bitmap in INT header or Trace-Type in IOAM header.

iii) INT-Sink or IOAM-Decapsulating Node (Terminate node): This node is the end points of the network collection where we extract the data from the packet and export it to a centralized collector.

In order to collect telemetry information in INT or IOAM deployment for a given flow, the network initially determines the set of paths the flow may traverse, and defines the start, transit and terminate nodes along those paths. For each of the network nodes in the set of paths, a policy (e.g., Access Control List (ACL)) defines the node functionality, i.e, start, transit or terminate. The network performs the configuration process described above for each node in the set of paths. Since millions of flows may traverse in the network, where each flow may have its specific configuration, implementing the configuration process become a complex task. Furthermore, the current INT or IOAM technology do not provide a mechanism to assign different functions to different nodes along the telemetry path of the flow, or override a certain telemetry function for a node based on collector dynamic needs.

Thus, in order to improve network telemetry data collection, monitoring and processing, there is a need for a mechanism to reduce the configuration process complexity in IOAM and INT technologies. Furthermore, there is a need for a mechanism for assigning different functions to each node associated to a flow dynamically, or overriding a specific function associated to a specific node. Such mechanisms may improve the overall network performance, and user experiences by accelerating network trouble shooting process.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3A-3H illustrate an example of how an IPv6 packet traverse through transit nodes and performs network telemetry functions.

FIG. 4 illustrates a flow diagram of an example method for collecting, monitoring and processing telemetry information of an IPv6 packet traversing through transit nodes

DESCRIPTION OF EXAMPLE EMBODIMENTS

Overview

Figure 1:
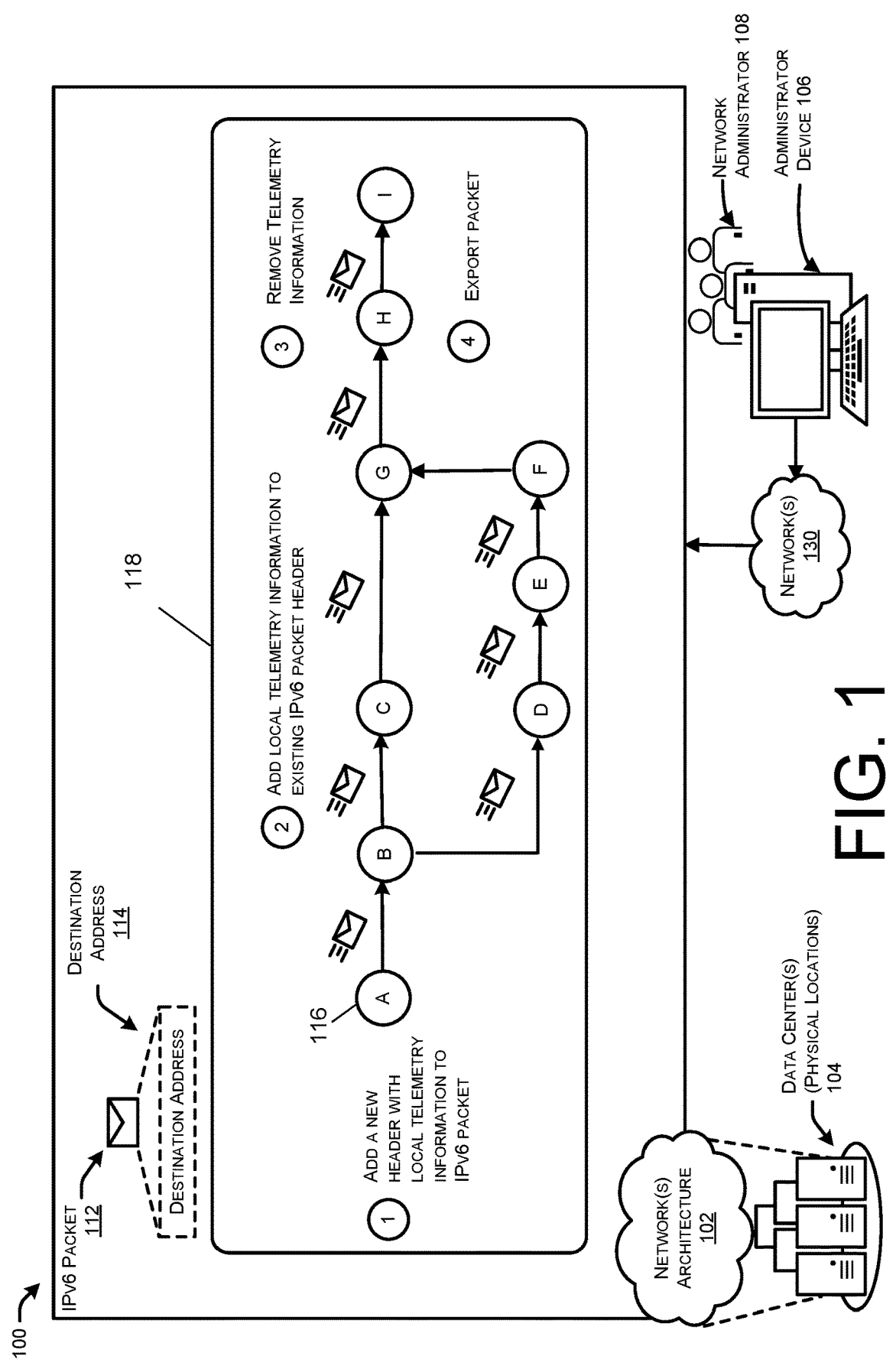
FIG. 1 illustrates a system-architecture diagram of an example of a network in which a source device generates an IPv6 packet that is forwarded to a collector via a path consisting of several network nodes.

This disclosure describes techniques for collecting, monitoring, and processing telemetry information from nodes in a Segment Routing IP6 (SRv6) network. A method performed by a first network node in a network to receive an Internet Protocol version 6 (IPv6) packet having an IPv6 header including a destination address field that is populated with a first destination address. In some examples the first destination address field may include a first Segment Identifier (SID) assigned to the first node, and an indication of a first function to be performed by the first network node. In addition, the first function may be associated with an operation for collecting, monitoring, and processing telemetry information. Further, the first network node may execute the first function to perform the operation for handling the telemetry information. Finally, the method may include sending, from the first network node, the first IPv6 packet having the IPv6 header which includes a second function to a second network node.

Additionally, the techniques described herein may be performed by a system and/or device having non-transitory computer-readable media storing computer-executable instructions that, when executed by one or more processors, performs the method described above.

Example Embodiments

Generally, segment routing over IPv6 (hereinafter "SRv6") comprises a technique of performing source routing where the source device selects a path over a network and places an ordered list of segment identifiers (hereinafter "SIDs") into a header of the IPv6 packet. The SIDs may comprise 128-bit IPv6 addresses that are placed into the header of the IPv6 packet where each IPv6 address indicates a locator, or an address of a particular SRv6 node or segment, and a function that is bounded to the SID and is to be executed locally on a particular node. Thus, a source device can specify the path through the network that an IPv6 packet is to traverse using a listing of SIDs in a segment routing extension header (SRH) of the header of the IPv6 packet. To collect and process telemetry information for a given flow in an SRv6 domain, the associated IPv6 packet needs to identify the set of paths that is going to traverse, and also determine the start, transit, and termination nodes. Currently, the start, transit, and terminate (end) nodes are determined from a policy (e.g., Access Control List (ACL)) which defines the flow, and bound a telemetry function to each node to perform a start, transit or terminate functionality at the node. This process may need to be executed on each of the nodes along the flow path.

Thus, configuring the nodes to collect and process telemetry information may require significant processing complexity. Moreover, the current telemetry process collects telemetry information based on an instruction bitmap carried in In-Band Network Telemetry (INT) header or In-Situ Operation, Administration, and Maintenance (IOAM)-Trace type carried in IOAM header, which is a field set by a start node. All nodes in the telemetry path may use the information provided in this field (e.g., telemetry function bound to each node) to collect the required telemetry information. However, when the telemetry functions are set by the start node, the instruction bit map or IOAM-trace type cannot be changed along the telemetry path. So, there is no existing mechanism to dynamically define an instruction bitmap.

Also, in scenarios where there is short-lived collector need to collect the telemetry information up to a particular point in a telemetry path quickly, there is no process to temporarily override the transit functions bounded to the nodes in telemetry path. The only way to achieve this currently, is to re-program the node to do TermStart function for that period of time, there is no on the fly way of over-riding the nodes to do different functions.

This disclosure describes techniques and mechanisms for reducing processing complexity of monitoring, collecting and processing telemetry information from a telemetry path. Further, the techniques described herein provides collecting telemetry information dynamically from different nodes or overriding of certain telemetry function on the fly in the telemetry path. According to the techniques described herein, an SRv6 routing mechanism, as described above, may be used to implement the above mentioned techniques for processing the telemetry information of a telemetry path, such as a pre-defined path determining the packet path is added to the SRH header of the packet. In this way, SRv6 SIDs carried in the IPv6 SRH packet header, include a set of network programing functions to be executed on each of the telemetry path nodes.

In some examples, to process the telemetry information dynamically, the SIDs carried in SvR6 may include locators to route the packet, functions that defines the functionalities the nodes in the telemetry path may execute when they receive the packet, and arguments carrying extra information may be required for the execution of the functions. When a node receives the packet, the node executes the function included in the node SID, and process the local telemetry information associated with the node. In a first example, the function may indicate to create a telemetry header, and add the local telemetry information associated with the node to the telemetry header. In a second example, the function may indicate to the node add the local telemetry information to the existing telemetry header. In a third example, the function may indicate to the node to extract telemetry information form the packet, and terminate the telemetry header. In a fourth example, the function may indicate to the node to extract the telemetry information from the packet but do not terminate the packet. In a fifth example the function may indicate to the node to generate an export packet, and export it to a collector.

In order to address the issue of dynamic telemetry processing in an SRv6 domain, the techniques described herein describe the functionality a node needs to execute on an incoming IPv6 packet when it receives the packet. As in some scenarios, the collector may have a short-lived need to quickly collect telemetry information up till a particular point in telemetry path, rather than waiting for final terminate node to collect the telemetry information and export. This can be done by the collector, by overriding the functions associated to the nodes in the short-lived path, and assign TermStart functions in SID list for those nodes.

According to the techniques described herein, a SRH header needs to be inserted to the incoming IPv6 packet at a Start node. This header may define the list of SIDs the packet may traverse, and thus may define the path the packet may traverse to collect the telemetry information. Specifically, when a flow is ingressing on a first node, and egressing on a second node, a first node may add a header including the list of SIDs indicating the telemetry path. As the packet may traverse from the first node to the second node via the telemetry path, it may find its SID at each of the nodes, and hence execute the telemetry function bounded to its SID. Then, the packet may change to promote to next SID, and may continue to move forward traversing via the nodes in the telemetry path. Once, the packet reaches the second node, it may terminate the header and export the packet, as indicated by the function bounded with the SID.

It is appreciated that, to implement the techniques required here, there is no need to define policy on the nodes in the telemetry path except the first node. It is noted that, the list of SIDs may be changed by the first node such that collection of the telemetry information is adapted dynamically according to the collector needs.

Although the techniques described herein are primarily with reference to IPv6, the techniques are generally applicable to any type of protocol, implemented at any layer, that may be used for segment routing using lists of SIDs. (e.g., MPLS). Similarly, the techniques may be applied for source routing between various types of nodes such as segments, hardware devices, virtual resources (e.g., virtual machines, containers, etc.) running on devices, and/or any combination thereof. While the techniques are described with reference to the destination address header of IPv6 packets, the techniques are equally applicable to type of header or extension usable for segment routing and any type of packets used for segment routing.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example of a network in which a source device generates an IPv6 packet that is forwarded to its destination via path consisting of several network nodes. System architecture 100 includes a network architecture 102 that may include one or more data centers 104, and in which network administrators 108 of administrator devices 106 utilize a domain-specific language to express and compile network functions to perform network operations. System architecture 100 may include a network controller (not shown) in the network architecture 102 deploying the network function at an optimal location (e.g., on an optimal network component or device) in the network architecture 102.

In some examples, the network architecture 102 may include devices that are housed or located in one or more data centers 104 (or other physical locations). The network architecture 102 may include one or more networks implemented by any viable communication technology, such as wired and/or wireless modalities and/or technologies. The network architecture 102 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The network architecture 102 may include devices, virtual resources, or other nodes that relay packets from one network segment to another by nodes in the computer network. The network architecture 102 may include multiple devices that utilize the network layer (and/or session layer, transport layer, etc.) in the OSI model for packet forwarding, and/or other layers. The network architecture 102 may include various hardware devices, such as routers, switches, gateways, smart NICs, NICs, ASICs, FPGAs, servers, and/or any other type of device. Further, the network architecture 102 may include virtual resources, such as VMs, containers, and/or other virtual resources.

The one or more data centers 104 may be physical facilities or buildings located across geographic areas that designated to store networked devices that are part of the network architecture 102. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. In some examples, the data centers 104 (physical and/or virtual) may provide basic resources such as processor (CPU), memory (RAM), storage (disk), and networking (bandwidth). However, in some examples the devices in the packet-forwarding networks 102 may not be located in explicitly defined data centers 104, but may be located in other locations or buildings.

The network 102 may include any type of networking device, such as servers, switches, routers, hubs, bridges, gateways, modems, repeaters, access points, etc. As illustrated, the network 102 may be utilized to transmit, route, forward, or otherwise send a data packet, such as an IPv6 packet 112, to a destination device based on a destination address 114 in the IPv6 packet 112. In some instances, a source device 116 may determine to transmit the IPv6 packet 112 across the network 102. For instance, a client device may have communicated a request to the source device 116 to utilize a service, application, etc., that is provided by or accessible to the destination device. The source device 116 may populate the IPv6 header with a Destination Address (DA) 114 in order to route the IPv6 packet 112 through the network 102.

As noted above, the source device 116 may designate the path that the IPv6 packet is to traverse to the destination using a segment routing protocol over the IPv6 data plane (e.g., SRv6). 128-bit IPv6 addresses may be used for the SIDs in the segment routing path. As described herein, a SID may comprise a locator field, a function field, and an argument field. As the IPV6 packet traverse over the data plane from node A to node I, the SID carried in the IPv6 packet header may enable the IPv6 packet to collect telemetry information dynamically of nodes A-D.

Each SID may be associated with a locator, a function and an argument such that intermediary nodes in the path execute the function to, for example, forward the IPv6 packet 112 onto the next node or segment in the SID listing. The argument may carry information required for the execution of the function and collecting the telemetry information in the data path from the node A-I.

In some examples, collecting the telemetry information may according to the techniques defined in Inband Network Telemetry (INT). In some other examples, collecting the telemetry information may be according to the techniques defined to In-Situ Operation Administration (IOAM) standards. The data boundary 118 defined the telemetry information collection boundary (e.g., INT-Domain, IOAM-Namespace). The data boundary 118 includes three different types of nodes: (i) Start (source) node A is the starting point for collecting telemetry information; the function associated to the start node is called start (source) function. (ii) Transit nodes B-I are in-between nodes which collect telemetry information based on the instruction encoded in the packet SID; the function associated to the transit node are called transit functions. (iii) Final (sink) node I is the end point for collecting telemetry information, the function associated to the final node is called end (sink) function.

To collect the telemetry information, the network 102 may need to determine a set of paths a flow may traverse in the data boundary 118, and also may identify the start, transit and end nodes along the set of paths for the given flow. For example, the network my consider the following paths in the data boundary 118 for the flow to traverse:

(i) A→B→C→G→H→I
(ii) A→B→C→D→E→F→G→H→I
(iii) A→B→D→E→F→G→H→I
(iv) A→B→D→C→G→H→I

In some examples, the network 102 may use an Access Control List (ACL) on each of the nodes in the data boundary 118, and associate a telemetry function to it. Once, the set of paths and nodes type in the data boundary 118 are defined, the packet from a flow may arrive at node A.

At "1" If packet matches the defined policy, then node A may execute the function as defined by policy for the node A. In some examples, node A may add a telemetry header with locally gathered telemetry information to the incoming packet. Then, the packet may be passed to node B At "2" node B, if the packet matches the defined policy, then node B may execute the transit function as indicated by the policy for the nodes. In some examples, the node B may add the local telemetry information to the telemetry header in the packet. Similarly, code-C-H may execute the transit functions as executed by node B.

At "3" the packet may arrive at node I, which is the end node in the flow path. If the packet matches the defined policy, then node I may execute the Sink or decap function as indicated by the policy for the end node. In some examples, the nNode I will extract all telemetry information from incoming packet, remove the telemetry header and combine it with its own local telemetry information to form an EXPORT packet.

At "4" the node I exports the EXPORT packet having all the telemetry information to a collector.

It is appreciated that collecting and processing the network telemetry information in the data boundary 118, may be performed dynamically during the flow path. For instance, the node B may be defined as a start node for collecting telemetry information. In this case, the telemetry path may be changed, and each node in the flow path may perform a different function from the one defined in the ACL. In some scenarios, where the defined telemetry may break due to route failure, the network architecture 100 may enable the flow to select another telemetry path for the flow dynamically. In some scenarios, when the collector needs a short period of time to collect and process telemetry information till a particular point in the flow path, the network architecture 100 may override the functions bounded to the SIDs of the flow to define a different telemetry collection process according to the collector needs.

Figure 2:
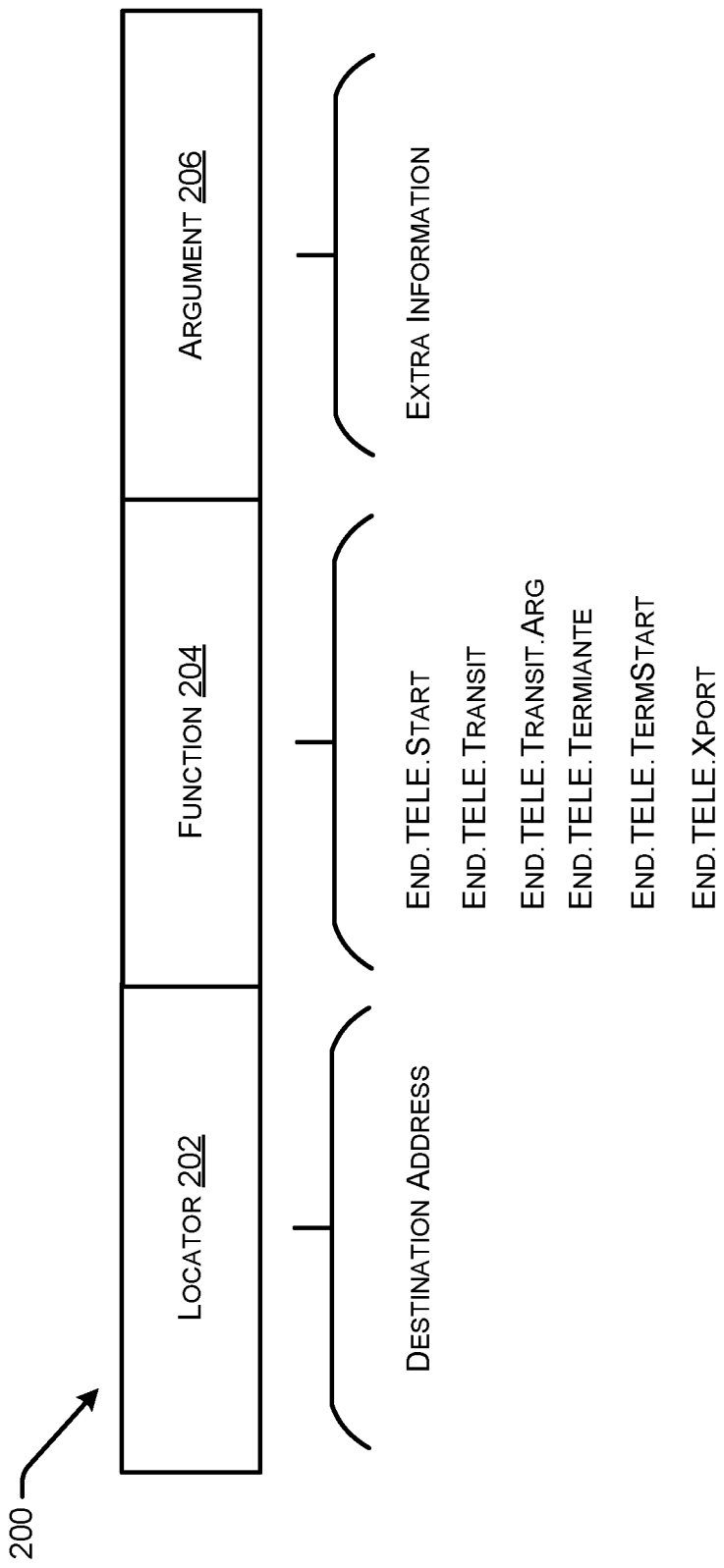
FIG. 2 illustrates a block diagram of an SRv6-Segment Identifier (SID) carried in an IPv6 header of a packet illustrating SRv6-SID parts which enable and IPv6 packet to route through transit node.

FIG. 2 illustrates a block diagram of an SRv6-Segment Identifier (SID) carried in an IPv6 header of a packet illustrating SRv6-SID parts which enable and IPv6 packet to route through transit node. The SRv6 SID 200 may include 128 bits.

As illustrated, the SID 200 may include locator field 202, function field 204, and the argument function 206. The SRv6 packet may include a slit of SIDs, where each SID may be associated to a node in the network. The locator field may be used by other nodes in the network to route the packet to this node. In some examples, the locator size maybe configurable. In some examples, 64 bits are allocated to the locator. The function field 204, may define the functionality a node needs to execute on the packet. Several different function may be associated to this node. The argument field 206, may include the information which may be required for execution of the function associated to the function field 204.

In some example, the function field 204 may include a set of functions according to the node type (start, transit, end). Table 1 illustrates, some examples of telemetry functions may be carried in field 204 as described in detail herein. 1 and described herein.

TABLE 1

| Function Name |
| --- |
| End.Tele.Start |
| End.Tele.Trasnit |
| End.Tele.Transit.Arg |
| End.Tele.Terminate |
| End.Tele.TermStart |
| End.Tele.Xport |

End.Tele.Start function when executed by a node may perform regular SRv6-END functionality in combination with Telemetry-Start functionality defined in SRv6 network. When a Node receives a packet whose IPv6-DA is S, and S is a local END.TELE-START SID, then the node may perform one of the followings:
i) Execute the regular SRv6-END function.
ii) Add a new Telemetry header and the associated node local telemetry information.

In INT SRv6 deployment scenario, an INT header may be added to IPv6 header. In IOAM SRv6 deployment, a trace-option header may be added to the IPv6 header.

End.Tele.Transit function when executed by a node may perform regular SRv6-END functionality in combination with telemetry-transit functionality. When a Node receives a packet whose IPv6-DA is S and S is a local END.TELE-Transit SID, then the node may perform one of following:
i) Execute the regular SRv6-END function.
ii) Add the node local telemetry information to the already existing telemetry header.

In INT SRv6 deployment scenario, an INT header may be added to IPv6 header. In IOAM SRv6 deployment, a trace-option header may be added to the IPv6 header.

Add the local telemetry information to the existing telemetry header. If this this function is deployed in INT domain, the local telemetry information is added to the INT header, and if this function is deployed in IOAM domain, the local telemetry information is added to the IOAM trace-type header.

End.Tele.Transit.Arg function when executed by a node may enable dynamically defining a different INT Instruction bitmap or IOAM trace type field than what is being carried in telemetry header. For instance, in some scenarios where the collector needs a particular transit node to collect a different telemetry information than what being instructed in telemetry header, this function may be used to collect the telemetry information. In some scenario, this function may be defined as a variation of End.Tele.Transit where it may include an argument carrying INT-Instruction bitmap or IOQAM trace type.

End.Tele.Terminate function when executed by a node may perform regular SRv6-END functionality in combination with telemetry-terminate functionality. When a node receives a packet whose IPv6-DA is S and S is a local END.TELE.Terminate SID, then the node perform one of the following:
  i) Execute the regular SRv6-END function.
  ii) Extract all the telemetry information from incoming telemetry packet, and terminate the telemetry header. In some examples, it may create an EXPORT packet out of this extracted telemetry information and then export it to collector.

End.Tele.TermStart function when executed by a node may perform the regular SRv6-END functionality in combination with telemetry (e.g., terminate, start) functionality. When a node receives a packet whose IPv6-DA is S, and S is a local END.TELE.TermStart SID, then the node may perform one of the following:
  i) Execute the regular SRv6-END function.
  ii) Extract all the telemetry information from incoming telemetry packet, but does not terminate the telemetry header. In some examples, it also may create a telemetry EXPORT packet out of this extracted telemetry information only, and may export it to collector. In some other examples, it may add the local telemetry information to the existing telemetry header, and may forward the packet to a next node in the flow path.

End.Tele.Xport function when executed by a node may perform regular SRv6-End functionality in combination with telemetry export function. This function is similar to INT-postcard mode where each node exports its telemetry information directly to the collector. When a Node receives a packet whose IPv6-DA is S and S is a local END.Tele.Xport SID, then the node may perform one of the following:
  i) Execute the regular SRv6-END function.
  ii) Create a telemetry EXPORT packet, and add the local telemetry information to it and export it to collector. No changes done to the packet.

T.Insert.Tele.Start function may define the insertion of a telemetry header to the incoming packet. The added SRH telemetry header may define the telemetry path including a list of nodes SIDs the packet may traverse and collect the required telemetry information. In some examples, when a node receives a packet whose IPv6 Destination Address (DA) is neither a local address nor SID of the node, then the node may perform the followings
  i) Insert a new SRH header with a SID list that defines the telemetry path.
  ii) Execute the telemetry Start functionality i.e., adds a new telemetry header with node local telemetry information.

FIG. 3A-3H illustrate an example of how an IPv6 packet associated to a flow traverse through transit nodes and performs network telemetry functions.

Figure 3A:
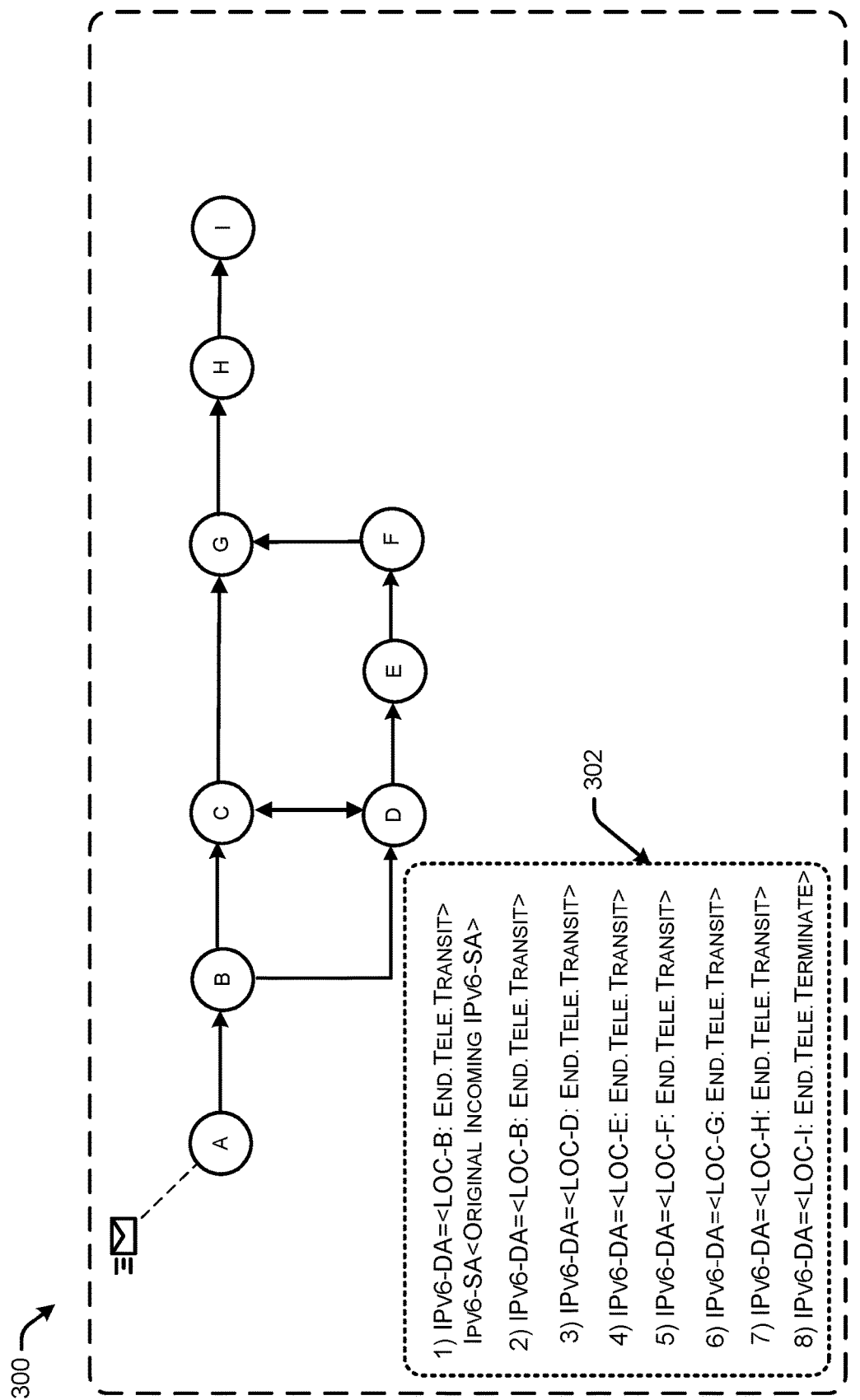

As illustrated in FIG. 3A, the sets of paths (i)-(iv) described in FIG. 1 may be considered for the flow to traverse and collects the telemetry information. In this regard, as the packet arrive at node A (it reaches node by IPv6 Source Address (SA) address), node A may trigger a T.Insert.Tele.Start function (defined above) to steer the flow into a SRv6 policy, and thus may select one of the paths, and insert a Segment Routing Header (SRH) in the packet. After the SRH is inserted, it may execute the telemetry Start functionality, and may add telemetry header and node local telemetry information to the packet. For instance, if the packet selects path (iii) described in FIG. 1 (A→B-→D→E→F→G→H→I), then the inserted SRH may include End.Tele.Transit for nodes B, D, F, G, H, and End.Tele.Terminate for node I in its function field of its SID. The list of SID functions of SRH for node A is shown in 302.

Figure 3B:
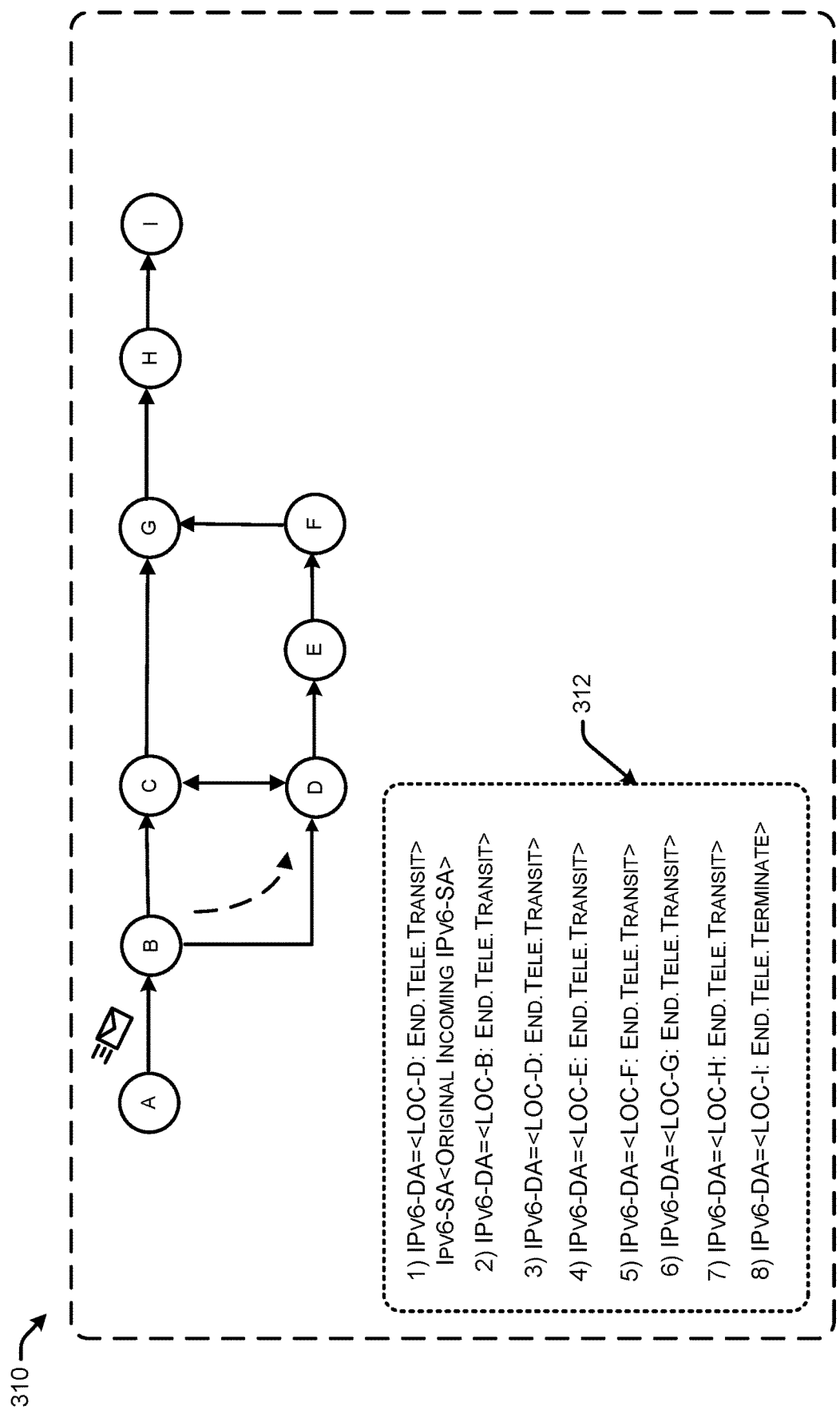

As illustrated in FIG. 3B, when the packet arrives at node B, it may find the node B SID in IPV6-DA, and hence may execute SRv6.End.Tele.Transit on the packet to add the local telemetry information to the existing SRH. Once the node B executes SRv6.End.Tele.Transit on the packet, the SID may be changed to the SID as shown in 312. Then, the packet may be promoted to the next SID carried in the SRH, and traverse in the path via nodes D, E, F, G, H, I.

Figure 3C:
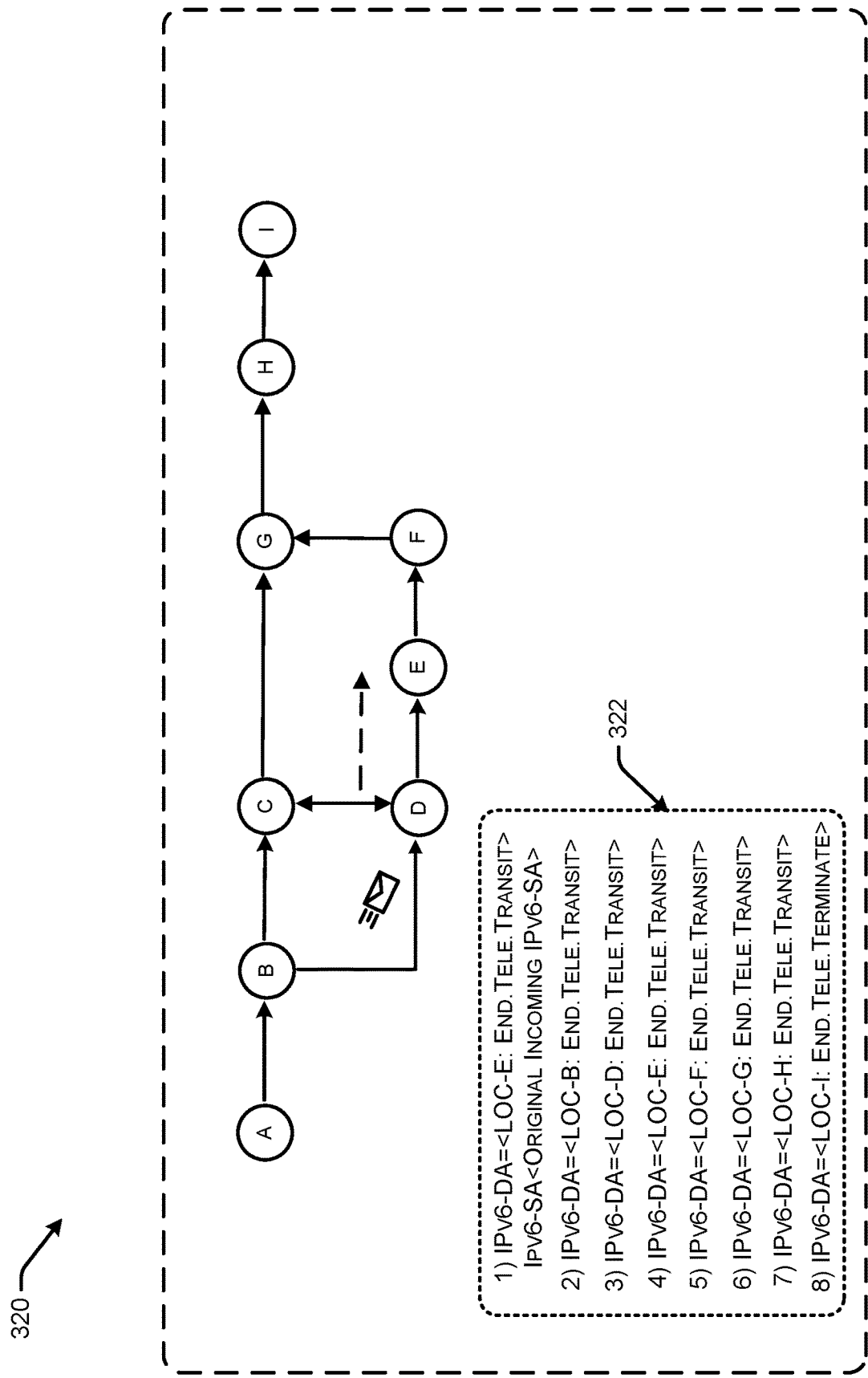

As illustrated in FIG. 3C, when the packet arrives at node D, it may find the node D SID in IPV6-DA, and hence may execute SRv6.End.Tele.Transit on the packet to add the local telemetry information to the existing SRH. Once the node D executes SRv6.End.Tele.Transit on the packet, the SID may be changed to the SID as shown in 332. Then, the packet may promote to the next SID carried in the SRH, and traverse in the path via nodes F, G, H, I.

As illustrated in FIG. 3D, when the packet arrives at node F, it may find the node E SID in IPV6-DA, and hence may execute SRv6.End.Tele.Transit on the packet to add the local telemetry information to the existing SRH. Once the node E executes SRv6.End.Tele.Transit on the packet, the SID may be changed to the SID as shown in 342. Then, the packet may promoted to the next SID carried in the SRH, and traverse in the path via nodes F, G, H, I.

As illustrated in FIG. 3E, when the packet arrives at node F, it may find the node F SID in IPV6-DA, and hence may execute SRv6.End.Tele.Transit on the packet to add the local telemetry information to the existing SRH. Once the node F executes SRv6.End.Tele.Transit on the packet, the SID may be changed to the SID as shown in 352. Then, the packet may be promoted to the next SID carried in the SRH, and traverse in the path via nodes G, H, I.

Figure 3F:
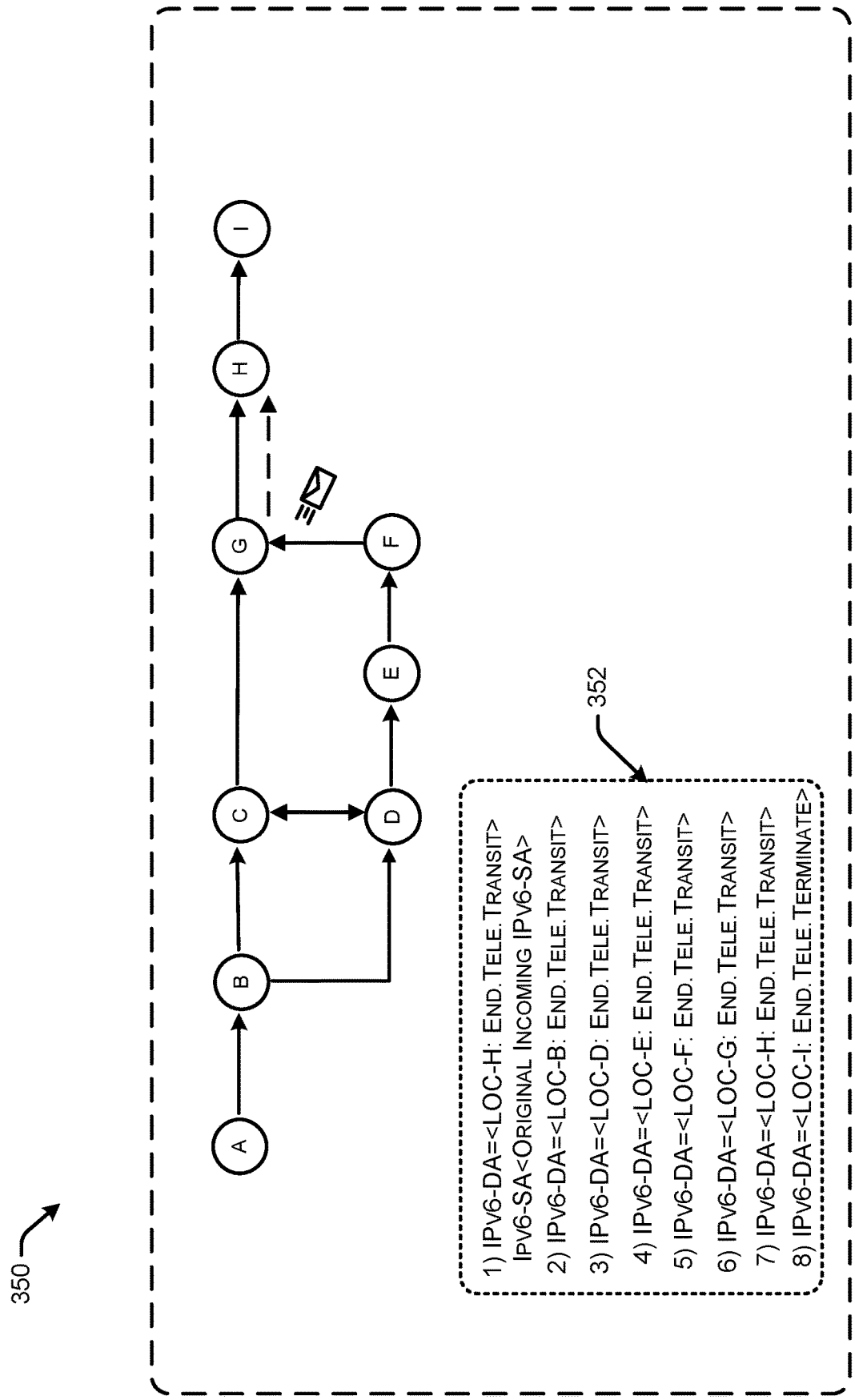

As illustrated in FIG. 3F, when the packet arrives at node G, it may find the node G SID in IPV6-DA, and hence may execute SRv6.End.Tele.Transit on the packet to add the local telemetry information to the existing SRH. Once the node G executes SRv6.End.Tele.Transit on the packet, the SID may be changed to the SID as shown in 362. Then, the packet may be promoted to the next SID carried in the SRH, and traverse in the path via nodes H, I.

Figure 3G:
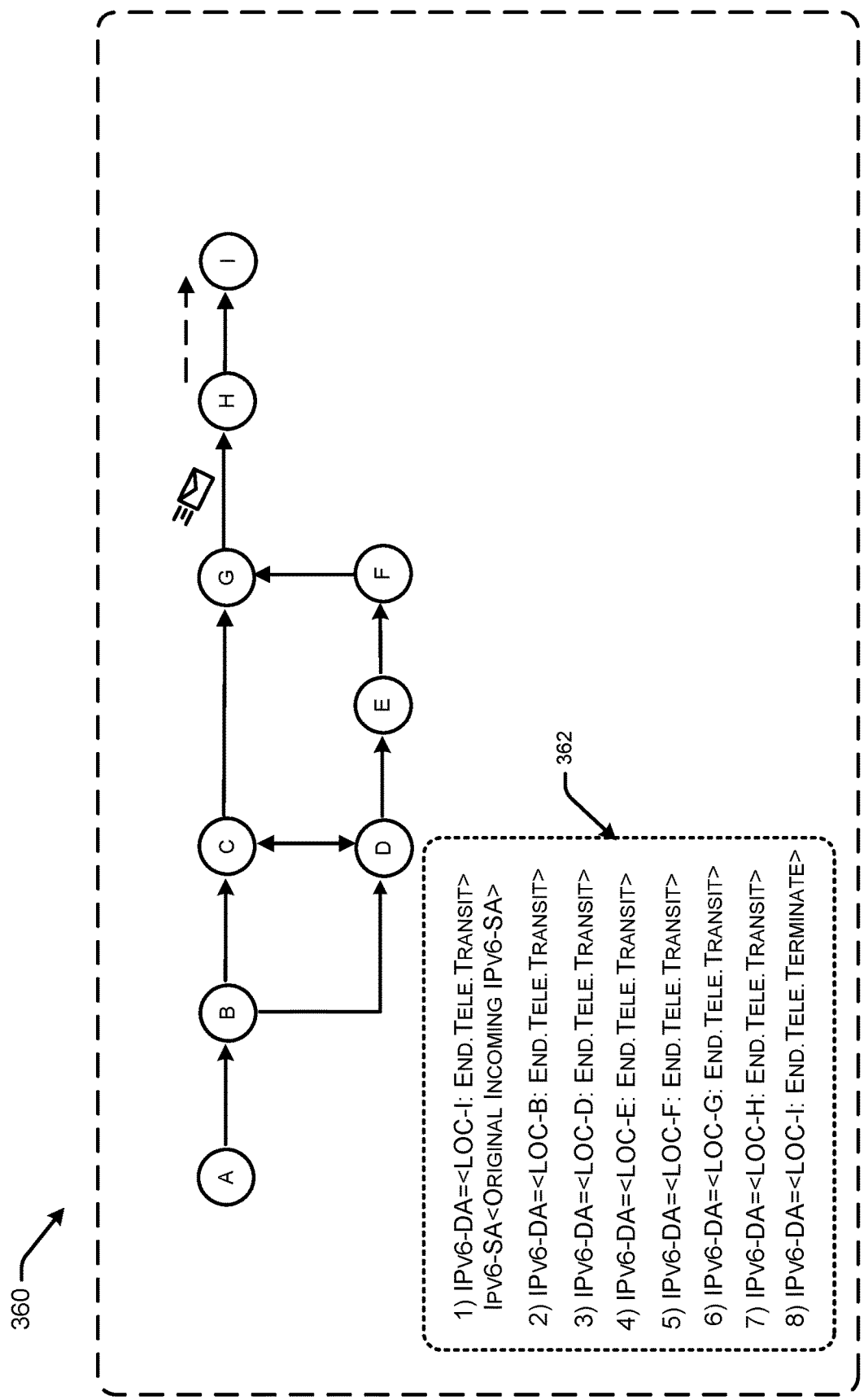

As illustrated in FIG. 3G, when the packet arrives at node H, it may find the node H SID in IPV6-DA, and hence may execute SRv6.End.Tele.Transit on the packet to add the local telemetry information to the existing SRH. Once the node H executes SRv6.End.Tele.Transit on the packet, the SID may be changed to the SID as shown in 372. Then, the packet may promote to the next SID carried in the SRH, and traverse in the path to reach node I.

As illustrated in FIG. 3H, when the packet arrives at node I, it may find the node H SID in IPV6-DA, and hence may execute SRv6.End.Tele.Terminate on the packet to extract the telemetry information from the packet, remove the telemetry header and may also strip SRH if it's a PSP node. The final packet SID is shown in 382.

In some examples, the network may decide to collect telemetry information for a subset of the telemetry path described in FIGS. 3A-3H. In this scenario, the SRv6 policy on node A may be changed to define a new SRH SID which includes only the subset of the transit nodes the network desire to collect the telemetry information. For example, if the subset of telemetry path is defined as A→D→F→H→I, the node A may trigger T.Insert.Tele.Start function on node A to insert an SRH to the packet and add the node A telemetry information to it. In this case, the SRH SID may be defined as:

IPv6-DA = <LOC-D:End.Tele.Transit> IPv6-SA= <Original Incoming IPv6-SA> [<LOC-D:End.Tele.Transit>, <LOC-F:End.Tele.Transit>, <LOC-H:End.Tele.Transit>, <LOC-I:End.TELE.Terminate>, <Original Incoming IPv6-DA>], SL=4

In some examples, the network may decide to collect telemetry information for a subset of the telemetry path described in FIGS. 3A-3H, but also may want to terminate the telemetry path on a different node than node I. In this scenario, the SRv6 policy on node A may be changed to define a new SRH SID which includes only the subset of the transit nodes the network desire to collect the telemetry information and end node. For example, if the subset of telemetry path is defined as A→D→F→H, the node A may trigger T.Insert.Tele.Start function on node A to insert an SRH to the packet, add the node A telemetry information to it, and determine the end node H. In this case, the SRH SID may be defined as:

IPv6-DA = <LOC-D:End.Tele.Transit> IPv6-SA= <Original Incoming IPv6-SA> [<LOC-D:End.Tele.Transit>, <LOC-F:End.Tele.Transit>, <LOC-H:End.Tele.Terminate>, <Original Incoming IPv6-DA>], SL=3

In some examples, the network may decide to collect telemetry information for a subset of the telemetry path described in FIGS. 3A-3H, terminate the telemetry path on a different node than node I, and collect different set of telemetry information than what was requested in SRH. In this scenario, the SRv6 policy on node A may be changed to define a new SRH SID which includes only the subset of the transit nodes the network desire to collect the telemetry information and end node. For example, if the subset of telemetry path is defined as A→D→F→H, and the network may want to collect different telemetry information on node F than what was requested in telemetry header, the node A may trigger T.Insert.Tele.Start function on node A to insert a new SRH to the packet, add the node A telemetry information to it, define the new set of telemetry information for node F, and determine the end node H. In this case, the SRH SID may be defined as:

IPv6-DA = <LOC-D:End.Tele.Transit> IPv6-SA= <Original Incoming IPv6-SA> [<LOC-D:End.Tele.Transit>, <LOC-F:End.Tele.Transit.Arg>, <LOC-H:End.Tele.Terminate>, <Original Incoming IPv6-DA>], SL=3

It is noted that the argument field of <LOC-F:End.TELE.Transit.Arg> may carry a different telemetry instruction than the one being carried in telemetry header. This may enable collector to dynamically collect different telemetry information on transit node F.

In some examples, the network may decide to collect telemetry information for a first and a second flow arriving at node A such that the first flow may have a different telemetry path than the second flow. For examples the flow may have the following telemetry paths
  Flow-1: A→D→F→H
  Flow-2: A→C→E→G Accordingly, two different SRv6 policies may be defined on node A, one for the first flow, and one for the second flow. When the first flow packet arrives at node A, it may trigger T.Insert.Tele.Start function, and derive the first path as SRH list. When the second flow packet arrives at node A, it may trigger T.Insert.Tele.Start function and derive, the second path as SRH list. In this scenario, the SRH SID may be defined as:

Flow 1:
IPv6-DA = <LOC-D:End.Tele.Transit> IPv6-SA= <Original Incoming IPv6-SA> [<LOC-D:End.Tele.Transit>, <LOC-F:End.Tele.Transit>, <LOC-H:End.Tele.Terminate>, <Original Incoming IPv6-DA>] , SL=3
Flow 2:
IPv6-DA = <LOC-C:End.Tele.Transit> IPv6-SA= <Original Incoming IPv6-SA> [<LOC-C:End.Tele.Transit>, <LOC-E:End.Tele.Transit>, <LOC-G:End.Tele.Terminate>, <Original Incoming IPv6-DA>], SL=3

In some examples, the network may decide to collect telemetry information for a first and a second flow arriving at node A such that the first flow may have a completely different telemetry path than the second flow. For examples the flow may have the following telemetry paths
  Flow-1: A→D→F→:H
  Flow-2: B→E→G→I It is noted that the first flow start node is A, while the second flow start node in B. When the first flow packet arrives at node A, it may trigger T.Insert.Tele.Start function, and derive the first path as SRH list. when the second flow packet arrives at node A, it may trigger T.Insert function and derive, the second path as SRH list. In this scenario, the SRH SID may be defined as:

Flow 1:
IPv6-DA = <LOC-D:End.Tele.Transit> IPv6-SA= <Original Incoming IPv6-SA> [<LOC-D:End.Tele.Transit>, <LOC-F:End.Tele.Transit>, <LOC-H:End.Tele.Terminate>, <Original Incoming IPv6-DA>], SL=3
Flow 2:
IPv6-DA = <LOC-B:End.Tele.Start> IPv6-SA= <Original Incoming IPv6-SA> [<LOC-B:End.Tele.Start>, <LOC-E:End.Tele.Transit>, <LOC-G:End.Tele.Transit> <LOC-I:End.Tele.Terminate>, <Original Incoming IPv6-DA>], SL=4

It is appreciated that for the second flow node A doesn't triggers any telemetry function, the node may trigger to execute an End.Tele.Start function only when the packet reaches node B and finds its SID in IPv6-DA.

In some examples, the network may decide to collect telemetry information for a subset of telemetry path described in FIG. 3A-3H, such as the path A→D→F→H→I where the Minimum Transmission Unit (MTU) between node F and H is less than the packet size. In such case, End.Tele.TermStart may be added for node F in SRH, and thus node A may execute T.Insert.Tele.Start function, and derive the defined telemetry path. In the SRH list. In this scenario, the SRH SID may be defined as:

IPv6-DA = <LOC-D:End.Tele.Transit> IPv6-SA= <Original Incoming IPv6-SA> [<LOC-D:End.Tele.Transit>, <LOC-F:End.Tele.TermStart>, <LOC-H:End.Tele.Transit>, <LOC-I:End.Tele.Terminate>, <Original Incoming IPv6-DA>], SL=4

Once the packet arrives at node F, it sees its SID in IPv6 DA and executes End.Tele.TermStar.

IPv6-DA = <LOC-F:End.Tele.TermStart> IPv6-SA= <Original Incoming IPv6-SA> [<LOC-D:End.Tele.Transit>, <LOC-F:End.Tele.TermStart>, <LOC-H:End.Tele.Transit>, <LOC-I:End.Tele.Terminate>, <Original Incoming IPv6-DA>], SL=3

In some examples, the network may decide to collect telemetry information from a particular node in the flow path. For example, in the flow path A→C→G→H→I, the node G maybe defined to collect the telemetry information. In this scenario, the node A may include this flow in its policy, and derive the flow path in its SRH SD list. Thus, once the flow arrives at node A, it may execute T.Insert function, and add SRH SID list. In this scenario, the SRH SID may be defined as:

```
IPv6-DA = <LOC-C:SRv6-End> IPv6-SA= <Original Incoming
IPv6-SA> [<LOC-C: SRv6-End >, <LOC-G:End.Tele.Export>, <LOC-H:
SRv6-End >, <LOC-I: SRv6-End >, <Original Incoming IPv6-DA>],
SL=4
```

It is appreciated that when the packet arrives node C, it may execute an SRv6-End function, promote the next SID inline as its IPv6-DA, and move forward to the next node in the telemetry path. Once the packet arrives at node G, it may find its SID in IPv6-DA, and executes both SRv6-End and Telemetry Export function. Once Node G has exported the telemetry information, the packet goes out un-edited, and the rest of nodes in the SID may execute the SRv6-END function towards its final destination.

As describe previously, the telemetry process of an SRv6 network described herein may require using an instruction bitmap defining flow profile. In some examples, when End.Tele.Start is used, the bitmap instruction may be derived from SRv6 function table. In some examples, when End. Tele. Transit, End. Tele. Terminate, or End.Tele.TermStart is used the bitmap instruction may be derived from INT header, SRv6 function table, or IPv6 DA carrying it as an argument. In some scenarios, when the INT source desires a particular transit node to collect a different set of telemetry information, may insert a different instruction bitmap in the argument field of the IPv6 DA, and may use IPv6 Da for driving the instruction bitmap.

FIG. 4 illustrate a flow diagrams of example methods 400 that illustrate an example method for collecting, monitoring and processing telemetry information of an IPv6 packet traversing through transit nodes. The logical operations described herein with respect to FIG. 4 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 4 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

At step 402, a first network node in a network may receive, an IPv6 packet having an IPv6 header including a destination address field that is populated with a first destination address. The first destination address includes, a first segment identifier (SID) assigned to the first node, and an indication of a first function to be performed by the first network node, wherein the first function is associated with an operation for handling telemetry information. In addition, the SID may include an argument field that carry extra information required for executing the first function.

At step 404, the first network node may execute the first function to perform the operation for handling the telemetry information. The first function may include different functionality according to node types as described in detail herein. In some examples, the first node may add a telemetry header to the IPv6 SRH, and add the first node local telemetry information to the telemetry header. The first function may be executed on all the nodes in the telemetry path to dynamically collect the telemetry information from the IPv6 packet.

At step 406, once the first network node adds the local telemetry information to the IPv6 packet, will send the packet to a second node. The second node may execute as second function included in its IPv6 header.

Figure 5:
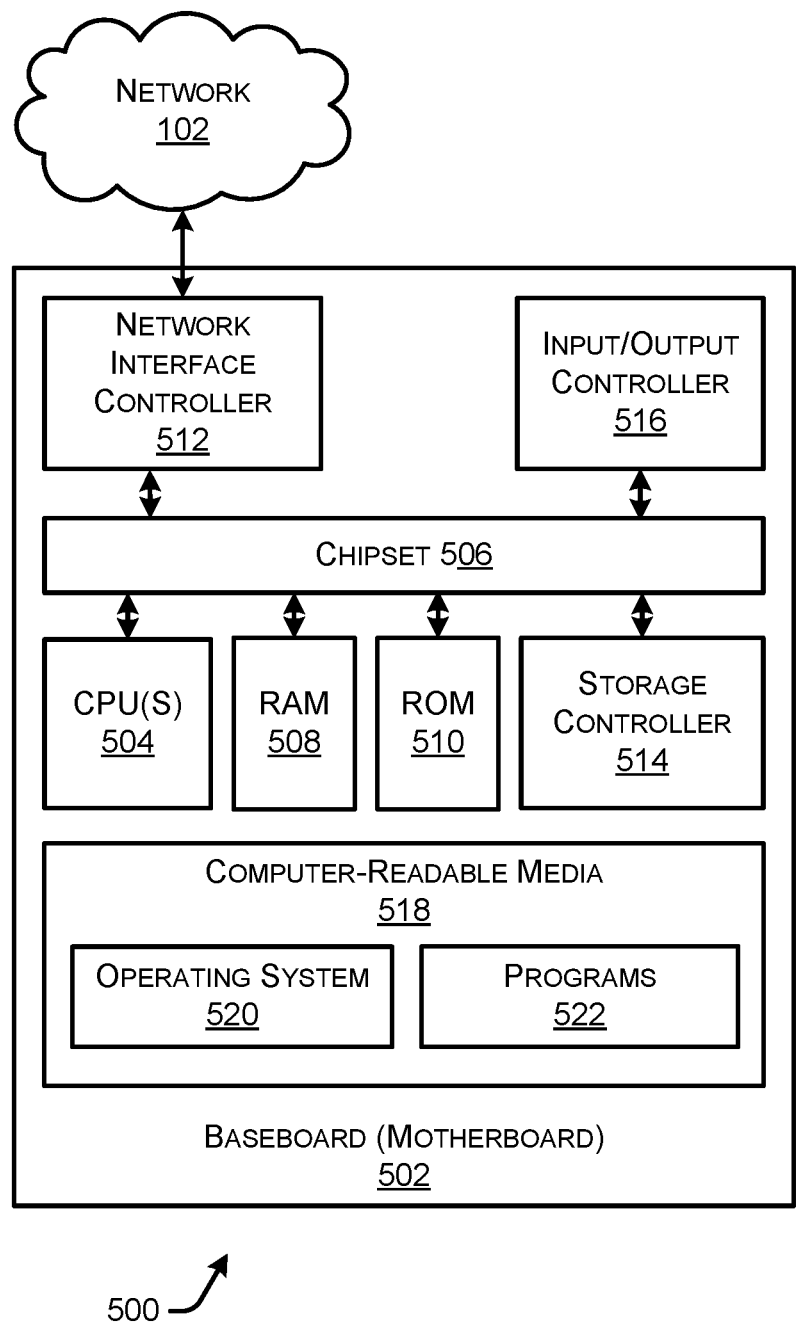
FIG. 5 is a computer architecture diagram showing an illustrative computer hardware architecture for implementing a network telemetry device that can be utilized to implement aspects of the various technologies presented herein.

FIG. 5 shows an example computer architecture for a computer 500 capable of executing program components for implementing the functionality described above. The computer architecture shown in FIG. 6 illustrates a node in a network 102 (e.g., start node A, transit node C, end node I) described herein, and may comprise networked devices such as servers, switches, routers, hubs, bridges, gateways, modems, repeaters, access points, etc. In some examples, however, the computer 500 may correspond to a conventional server computer, workstation, desktop computer, laptop, tablet, network appliance, e-reader, smartphone, or other computing device, and can be utilized to execute any of the software components presented herein.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 608, used as the main memory in the computer 600. The chipset 506 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network, such as the network 102. The chipset 506 can include functionality for providing network connectivity through a NIC 512, such as a gigabit Ethernet adapter. The NIC 512 is capable of connecting the computer 500 to other computing devices over the network 102. It should be appreciated that multiple NICs 512 can be present in the computer 500, connecting the computer to other types of networks and remote computer systems.

The computer 500 can be connected to a storage device 518 that provides non-volatile storage for the computer. The storage device 518 can store an operating system 520, programs 522, and data, which have been described in greater detail herein. The storage device 518 can be connected to the computer 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computer 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 518 by detecting the physical states or characteristics of one or more particular locations within the physical storage units.

In addition to the mass storage device 518 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the operations performed by the network 102, and or any components included therein, may be supported by one or more devices similar to computer 500. Stated otherwise, some or all of the operations performed by the network 102, and or any components included therein, may be performed by one or more computer devices 502 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computer 500. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 518 can store other system or application programs and data utilized by the computer 500.

In one embodiment, the storage device 518 or other computer-readable storage media is encoded with computer-executable instructions which, when loaded into the computer 500, transform the computer from a general-purpose computing system into a special-purpose computer capable of implementing the embodiments described herein. These computer-executable instructions transform the computer 500 by specifying how the CPUs 50→transition between states, as described above. According to one embodiment, the computer 500 has access to computer-readable storage media storing computer-executable instructions which, when executed by the computer 500, perform the various processes described above with regard to FIGS. 3A-3H. The computer 500 can also include computer-readable storage media having instructions stored thereupon for performing any of the other computer-implemented operations described herein.

The computer 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computer 500 might not include all of the components shown in FIG. 5, can include other components that are not explicitly shown in FIG. 5, or might utilize an architecture completely different than that shown in FIG. 5.

As described herein, the computer 500 may comprise one or more of a source device/node A, an intermediary device/transit node C, and/or a destination device/end node I. The computer 500 may include one or more hardware processors 604 (processors) configured to execute one or more stored instructions. The processor(s) 604 may comprise one or more cores. Further, the computer 500 may include one or more network interfaces configured to provide communications between the computer 500 and other devices, such as the communications described herein as being performed by the source device A, intermediary device C, and destination device I. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, IP protocols, and any other communication protocol.

The programs 522 may comprise any type of programs or processes to perform the techniques described in this disclosure for routing packets through the network(s) architecture 102, micro-segment routing instructions (e.g., micro SIDs). For example, the programs 522 may cause the computer 500 to perform techniques for communicating with other devices using any type of protocol or standard usable for performing SRv6 using SIDs and processing telemetry information of packet 112 traversing through a path of nodes in the network 102. Additionally, the programs 522 may comprise instructions that cause the computer 500 to perform the techniques for communicating data using various communication protocols described herein. Generally, the programs 522 may comprise one or more modules or components to perform any of the operations described herein by any of the different types of devices/nodes described herein. In some instances, the programs may run inside of virtual machines, containers, and/or other virtual resources types.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   determining that a first network node in the network is to perform an operation for handling telemetry data;
   generating an Internet Protocol version 6 (IPv6) packet to be generated;
   populating an IPv6 header of the IPv6 packet with a destination address, the destination address including:
   a segment identifier (SID) assigned to the first network node; and
   an indication of a function to be performed by the first network node, wherein the function is associated with an operation for handling telemetry information; and
   sending the IPv6 packet through the network to the first network node.

2. The method of claim 1, wherein the segment identifier (SID) includes:
   a locator part used to route the IPv6 packet to the first network node;
   a function part used to define functionality of the function; and
   an argument part used to carry extra information required by the first network node to perform the function.

3. The method of claim 1, wherein the operation causes the first network node to:
   add a telemetry header to the IPv6 packet that is configured to receive telemetry information associated with the first network node; and
   populate the telemetry header with telemetry information associated with the first network node.

4. The method of claim 3, wherein the operation includes an instruction indicting a type of the telemetry information for the first network node to collect.

5. The method of claim 1, wherein the operation causes the first network node to:
   extract the telemetry information from the IPv6 packet;
   generate a telemetry export package comprising the telemetry information; and
   export the telemetry export package to a second network node.

6. The method of claim 1, wherein the operation causes the first network node to refrain from handling the telemetry information in response to a maximum transmission unit (MTU) failure occurring.

7. The method of claim 1, wherein the operation causes the first network node to add a second telemetry header to the IPv6 packet, wherein the telemetry header defines a list of plurality of nodes for the IPv6 packet to traverse.

8. A system comprising:
   one or more processors; and
   one or more non-transitory computer-readable media storing computer-executable instructions that, when executed by the one or more processors, cause the one or more processors to:
   determine that a first network node in the network is to perform an operation for handling telemetry data;
   cause a source node to generate an Internet Protocol version 6 (IPv6) packet;
   cause the source node to populate an IPv6 header of the IPv6 packet with a destination address, the destination address including:
   a segment identifier (SID) assigned to the first network node; and
   an indication of a function to be performed by the first network node, wherein the function is associated with an operation for handling telemetry information; and
   cause the source node to send the IPv6 packet through the network to the first network node.

9. The system of claim 8, wherein the segment identifier (SID) includes:
   a locator part used to route the IPv6 packet to the first network node;
   a function part used to define functionality of the function; and
   an argument part used to carry extra information required by the first network node to perform the function.

10. The system of claim 8, wherein the operation causes the first network node to:
    add a telemetry header to the IPv6 packet that is configured to receive telemetry information associated with the first network node; and
    populate the telemetry header with telemetry information associated with the first network node.

11. The system of claim 10, wherein the operation includes an instruction indicting a type of the telemetry information for the first network node to collect.

12. The system of claim 8, wherein the operation causes the first network node to:
    extract the telemetry information from the IPv6 packet;
    generate a telemetry export package comprising the telemetry information; and
    export the telemetry export package to a second network node.

13. The system of claim 8, wherein the operation causes the first network node to refrain from handling the telemetry information in response to a maximum transmission unit (MTU) failure occurring.

14. The system of claim 8, wherein the operation causes the first network node to add a second telemetry header to the IPv6 packet, wherein the telemetry header defines a list of plurality of nodes for the IPv6 packet to traverse.

15. One or more non-transitory computer-readable storage medium storing computer-executable instruction that, when executed by one or more processors, cause the one or more processors to:
   determine that a first network node in the network is to perform an operation for handling telemetry data;
   cause a source node to generate an Internet Protocol version 6 (IPv6) packet;
   cause the source node to populate an IPv6 header of the IPv6 packet with a destination address, the destination address including:
      a segment identifier (SID) assigned to the first network node; and
      an indication of a function to be performed by the first network node, wherein the function is associated with an operation for handling telemetry information; and
   cause the source node to send the IPv6 packet through the network to the first network node.

16. The one or more non-transitory computer-readable of claim 15, wherein the segment identifier (SID) includes:
   a locator part used to route the IPv6 packet to the first network node;
   a function part used to define functionality of the function; and
   an argument part used to carry extra information required by the first network node to perform the function.

17. The one or more non-transitory computer-readable of claim 15, wherein the operation causes the first network node to:
   add a telemetry header to the IPv6 packet that is configured to receive telemetry information associated with the first network node; and
   populate the telemetry header with telemetry information associated with the first network node.

18. The one or more non-transitory computer-readable of claim 17, wherein the operation includes an instruction indicting a type of the telemetry information for the first network node to collect.

19. The one or more non-transitory computer-readable of claim 15, wherein the operation causes the first network node to:
   extract the telemetry information from the IPv6 packet;
   generate a telemetry export package comprising the telemetry information; and
   export the telemetry export package to a second network node.

20. The one or more non-transitory computer-readable of claim 15, wherein the operation causes the first network node to refrain from handling the telemetry information in response to a maximum transmission unit (MTU) failure occurring.

* * * * *